United States Patent [19]
Finestone et al.

[11] Patent Number: 5,670,015
[45] Date of Patent: Sep. 23, 1997

[54] PAPER-PLASTIC LAMINATE SHEETING

[76] Inventors: Arnold B. Finestone, 2400 Presidential Way, West Palm Beach, Fla. 33401; Gilbert Bloch, 3149 S. Malo Ct., Palm Beach Gardens, Fla. 33410

[21] Appl. No.: 543,616

[22] Filed: Oct. 16, 1995

Related U.S. Application Data

[60] Continuation-in-part of Ser. No. 57,963, May 4, 1993, which is a division of Ser. No. 818,544, Jan. 9, 1992, Pat. No. 5,244,702.

[51] Int. Cl.$^6$ .................. B32B 31/08; B42D 15/00
[52] U.S. Cl. .............. 156/549; 156/324; 156/379.6; 156/555; 40/6; 283/80
[58] Field of Search .................. 156/324, 272.6, 156/555, 547, 549, 379.6; 283/79–81, 94, 101; 40/6, 630

[56] References Cited

U.S. PATENT DOCUMENTS

| | | | |
|---|---|---|---|
| 3,018,189 | 1/1962 | Traver. | |
| 3,930,930 | 1/1976 | De Keyser | 156/324 |
| 4,788,102 | 11/1988 | Koning | 428/40 |
| 5,092,949 | 3/1992 | Goncalves | 156/282 |
| 5,244,702 | 9/1993 | Finestone | 428/195 |
| 5,318,817 | 6/1994 | Ohno | 40/6 |
| 5,518,799 | 5/1996 | Finestone | 428/137 |

*Primary Examiner*—Daniel Stemmer
*Attorney, Agent, or Firm*—Pennie & Edmonds

[57] ABSTRACT

A paper-plastic laminate sheeting whose paper ply incorporates heat-activatable material that renders the sheeting useable for producing baggage tags and other products when heat-activated are then bar-coded or otherwise identified. In a system for producing the laminate sheeting, the paper ply is cold-laminated by a water-based adhesive to an oriented synthetic plastic film ply of high strength, whereby neither the heat-activatable material in the paper ply nor the orientation of the film ply is disturbed thereby.

11 Claims, 1 Drawing Sheet

PAPER-PLASTIC LAMINATE SHEETING

RELATED APPLICATIONS

This application is a continuation-in-part of our copending application Ser. No. 08/057,963, filed May 4, 1993, entitled "Paper-Plastic Laminate Sheeting," pending, which is a division of our application Ser. No. 818,544, filed Jan. 9, 1992, having the same title (now U.S. Pat. No. 5,244,702). The entire disclosures of our copending applications are incorporated herein by reference.

BACKGROUND OF INVENTION

1. Field of Invention

This invention relates generally to paper-plastic laminate sheeting of high strength, and more particularly to a laminate sheeting in which a paper ply is cold-laminated to a ply formed of an oriented film of synthethic plastic material, and to a system for producing this sheeting.

2. Status of Prior Art

The sheeting traditionally used in making envelopes, grocery bags and other types of dilatable container products is paper. Paper is a semi-synthetic material made by chemically processing cellulose fibers.

Apart from its low cost, an important advantage of paper is that it can be converted into envelopes and other types of dilatable container products by means of high speed equipment that functions to cut and fold the sheeting into the desired configuration, the folds and flaps of the product being bonded together, where necessary, by standard low-cost adhesives. Another advantage of paper in this context is that it can readily be printed and colored, using standard inks for this purpose. But such paper products suffer from several disadvantages, for they are characterized by low tear and burst strength, and are by no means water resistant; for unless coated, paper is highly absorbent.

The Peer U.S. Pat. No. 4,254,173 discloses a composite packaging material formed by a Kraft paper ply laminated by a curable adhesive, generally in solution or emulsion form, to a plastic film ply. In Peer, lamination is effected in a laminator in which heat is introduced to facilitate curing of the adhesive sandwiched between the plastic film and the paper material.

Our above-identified related copending application discloses a paper-plastic laminate sheeting capable of being converted by conventional equipment into envelopes, grocery bags and other container products that initially are in a flat state and are normally made of paper. The sheeting is composed of a paper facing sheet cold-laminated by means of a water-based adhesive to a reinforcing film of synthetic plastic material, such as polypropylene. The film is oriented to impart exceptional tear and burst strength characteristics to the resultant waterproof product. The product, whose exterior surface is formed by the paper facing sheet, is readily printable. For some applications, a paper facing sheet is cold-laminated to the other side of the film to produce a three-ply laminate sheeting.

A serious drawback of multi-ply laminate sheeting of the type heretofore known does not entirely reside in the structure of the sheeting, but rather in the environmental conditions which prevail in the course of producing the sheeting.

Most industrial adhesives used to interlaminate the several plies of the laminate sheeting, include volatile chemical solvents which are volatilized in the course of curing the adhesive. The resultant noxious fumes which are driven off into the atmosphere are environmentally objectionable. It becomes necessary, therefore, in the plant in which the laminate sheeting is produced, to provide filtration and other equipment to capture and treat the noxious fumes. This requirement adds substantially to the cost of production.

In those instances where hot melt adhesives such as in extrusion lamination in which the hot melt is extruded hot between the two plies of the laminate are used to interlaminate the plies of the laminate sheeting, not only do some of these adhesives give off objectionable fumes, but the heat involved may have adverse effect on the plies to which the hot melt adhesive is applied. Thus if one of the plies is a synthetic plastic film that has been uni-axially or bi-axially oriented to enhance its tensile strength, this orientation will be impaired by heat, for heat acts to relax the film and in doing so, to destroy its orientation.

In the case of the Peer laminate sheeting in which the adhesive is cured in a heated laminator, had the film included in the laminate been oriented, the heat applied thereto in the laminator would impair this orientation and weaken the film.

Another factor of practical importance is the time it takes to produce a paper-film laminate. Standard high-speed laminator equipment is designed to have a high maximum speed of say 1000 feet per minute. If therefore lamination of a paper ply to a plastic film ply can be effected at the full speed of this equipment, then production costs would be minimal. In a paper-film laminate in accordance with the invention which makes use of a solvent-free, water-based adhesive, this adhesive sets quickly, for the water is absorbed by the paper, hence this laminate can be produced at full speed in a standard laminator. In contradistinction, when use is made of a curable adhesive to effect lamination, including adhesives containing organic solvents, such as alcohol, or hydrocarbon-based solvents, or hot melt adhesives, then the necessary curing time and the time required to remove unreacted monomers, make it necessary to operate a standard laminator at a speed well below the maximum rate for it is designed. Thus in extrusion lamination using a hot melt adhesive, a laminator capable of a maximum speed of 1000 ft/min is limited to operation at a speed of about 400 ft/min to 500 ft/min.

Extrusion laminated materials will usually separate when the laminated plies are later heated, whereas a laminate in accordance with the invention will not, because bonding of plies is complete.

A particular concern of the present invention is a paper-film laminate sheeting whose paper ply incorporates therein heat-activatable material which renders the sheeting useable for producing baggage tags and other products that when heat-activated are then bar coded or otherwise identified. Thus THERMOFAX papers are known which change color when heat is applied thereto. In producing a laminate sheeting in which the paper ply is heat-sensitive, should heat be applied in the course of lamination, this heat would prematurely activate the paper ply and thereby render it unuseable for its intended purpose.

The following patents are of prior art interest in regard to paper-plastic laminates. The British patent 1,569,447 to Steiner, and the Williams U.S. Pat. Nos. 4,041,202, 4,351, 877 and 4,557,971. Also of prior art interest in regard to the corona-discharge treatment of plastics are the Feldmeier et al. U.S. Pat. No. 5,180,599, Ohno et al. U.S. Pat. No. 4,636,427 and Lutzmann et al. U.S. Pat. No. 4,096,013.

SUMMARY OF INVENTION

In view of the foregoing, the main object of this invention is to provide a paper-plastic laminate of high-strength useable for producing containers, packages, baggage tags and various other products requiring high-strength and water-resistance, and to provide a system for producing this laminate.

More particularly, an object of this invention is to provide a paper-plastic laminate in which a paper ply is cold-laminated by a solvent-free, water-based adhesive to a synthetic plastic film ply whereby the laminate may be produced in standard laminator equipment at the highest speed for which the equipment is designed.

Yet another object of the invention is to provide a laminate sheeting of the above-type whose paper ply incorporates heat-activatable material whereby the sheeting is useable for producing baggage tags and other products which when heat-activated are then bar-coded or otherwise identified.

A significant feature of a laminate-sheeting in accordance with the invention having a heat-activatable paper ply is that this ply is cold laminated to an oriented film ply whereby neither the paper ply nor the orientation of the film ply is disturbed thereby.

Briefly stated, these objects are attained by a paper-plastic laminate sheeting whose paper ply incorporates heat-activatable material that renders the sheeting useable for producing baggage tags and other products that when heat-activated are then bar-coded or otherwise identified. In a system for producing the laminate sheeting, the paper ply is cold-laminated by a water-based adhesive to an oriented synthetic plastic film ply of high strength, whereby neither the heat-activatable material in the paper ply nor the orientation of the film ply is disturbed thereby.

BRIEF DESCRIPTION OF DRAWINGS

For a better understanding of the invention, as well as other objects and further features thereof, reference is made to the following detailed description to be read in conjunction with the accompanying drawings, wherein.

DESCRIPTION OF INVENTION

Paper-Plastic Laminate Sheeting

Figure 1:
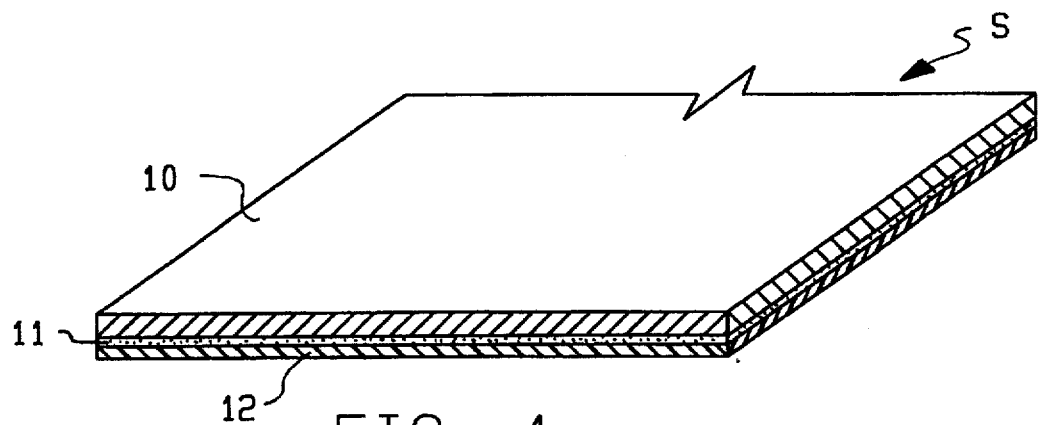
FIG. 1 illustrates a paper-plastic laminate sheeting in accordance with the invention.

Referring now to FIG. 1, shows therein in an enlarged scale is a flexible paper-plastic sheeting S in accordance with the invention. Sheeting S includes a paper ply 10 whose gauge, weight and quality are appropriate to the end use for which the sheeting is intended.

Cold-laminated by an adhesive layer 11 to the undersurface of paper sheet 10 is a reinforcing ply 12 formed of synthetic plastic material which is uni-axially or bi-axially oriented. Film materials suitable for this purpose are polypropylene, polyethylene, nylon, PVC or a polyester such as MYLAR. The film is thin relative to the thickness of the paper ply which affords body to the laminate sheeting.

The tensile strength of a synthetic plastic film is substantially increased by molecular orientation of the film material. In the case of biaxial orientation, orientation is in both the longitudinal and transverse directions. This is usually effected by controlled stretching of the unoriented film.

Since paper tends to absorb water in the laminating process, before the paper ply and the film ply are together fed into pressure rolls at a combining station and subjected to pressure to effect lamination, the inner surface of the film is first coated with the water-based adhesive which does not encounter the inner surface of the paper sheet until these two surfaces are about to meet in the pressure rolls. In this way, the period during the adhesive can be absorbed into the interior of the paper sheet is limited.

Cold lamination of the plies is effected at ambient temperature by a water-based adhesive, such as a polyacrylic copolymer composition having an affinity both for the paper ply and the film ply. Also useable as the water-based adhesive is a polyvinyl acetate modified copolymer. Because the water-based adhesive is fluid at ambient temperature and is not a hot melt adhesive, nor an adhesive which requires heat to effect curing thereof, no heat is applied to the bi-axially oriented film as it is being laminated to the paper ply.

It is important to bear in mind that a bi-axially oriented film is heat-sensitive and that at elevated temperatures, the film relaxes and loses its molecular orientation and tensile strength. It is known, for example, that when two sheets of bi-axially oriented polyester film are seamed together by means of an ultrasonically-activated sealing bar which create-ate internal friction and heat within the film, this causes the superposed films to soften and fuse. The resultant sealing line is weak, and the sheets then tend to tear along this line. Cold lamination at ambient temperature is, therefore, essential to the present invention in order to produce a laminate sheeting of high tear and burst strength under normal and accelerated condition.

It is to be noted that a synthetic plastic film material, such as polypropylene, is normally not receptive to adhesives, especially water-based adhesives. Hence if one were to apply to a surface of this film a water-based adhesive which is flowable at ambient temperature or at a temperature somewhat above ambient but not at the elevated temperature of a hot melt adhesive, this adhesive will not be adsorbed by the film. Essential to the invention is that the opposing surfaces of the film be treated so as to render them wettable and hence receptive to adhesives. To this end, these surfaces are subjected to a corona discharge treatment which enhances their surface energy, as measured in dynes, and thereby renders them wettable to allow for better bonding of adhesives applied thereto.

It is known to subject the surfaces of plastic film to corona discharge treatment and to produce a roll of this treated film which is held in storage for subsequent lamination to another sheet or ply. We have found, however, that such pretreated film has a limited effective life, and that when later laminated, the surfaces of the film are no longer fully active. In producing a paper-film laminate in accordance with the invention, the plastic film, whether or not pretreated to render the surfaces wettable, is subjected to corona discharge treatment just prior to lamination, so that the surfaces are then fully active before adhesive is applied thereto.

When the sheeting is intended to be used to produce baggage tags, labels or other products which require identifying indicia, such as a bar code, then paper ply 10 has incorporated therein heat-activatable material which changes color or shade when heat is applied thereto. Thus if the paper is normally white in color, when heat is applied to a selected region thereof, the paper then turns black in the region in which heat is applied.

Figure 2:
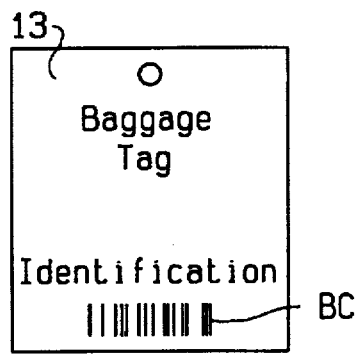
FIG. 2 shows a baggag tag produced from the sheeting.

FIG. 2 shows a baggage tag 13 made from a paper film laminate sheeting in accordance with the invention, the tag being tied to or otherwise attached to a piece of luggage to be identified. The heat-activatable paper ply which constitutes the outer ply or the tag is passed through a heated coder which serves to impress the identifying bar-code BC thereon. The bar-code is formed by a change in color in the heat sensitive paper, not by printing. Hence the pattern in which heat is applied to the paper, determines the character of the bar code produced on the paper. But the heat is applied onto the limited bar-code region, and does not generally affect the orientation of the film to which the paper is cold-laminated.

The Laminating System

Figure 3:
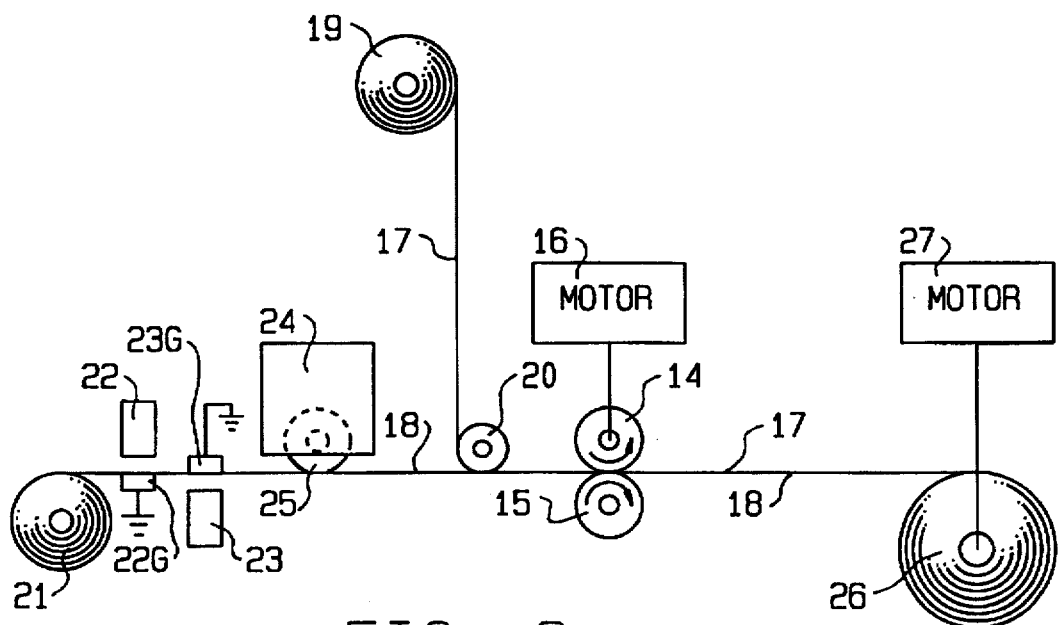
FIG. 3 shows, in schematic form, a system adapted to produce the sheeting.

FIG. 3 schematically illustrates a single-stage system for producing a paper-plastic film laminate sheeting in accordance with the invention. The system includes a combining station having a pair of cooperating pressure rolls 14 and 15 driven at high speed by a motor 16. The nip between these rolls is appropriate to the thickness of the webs to be laminated to provide the desired degree of laminating pressure to ensure secure bonding of the webs.

Fed concurrently into the nip of rolls 14 and 15 at the combining station are a web 17 of heat-activatable paper for forming the paper ply 10 of the sheeting, and a web 18 of synthetic plastic film material to form plastic film ply 12. The film which may be of polypropylene, polyethylene, polyester or other suitable plastic material which is bi-axially oriented. Web 17 is drawn from a paper supply reel 19 supported at an elevated position. Paper web 17 is drawn downwardly from this reel and is guided by an idler roll 20 into a horizontal path leading into the nip of the combining rolls.

Film web 18 is drawn from a film supply reel 21 which is placed at a position to feed the film web directly along a horizontal path toward the nip of the combining rolls. Reel 21 is placed well in advance of the combining station in order to expose a fairly long stretch of film web before it enters the combining rolls.

Along this stretch of bi-axially oriented film web 18 having a high dielectric constant, is placed a first corona discharge electrode 22 which is spaced above the upper surface of the film to create an ionizable air gap therebetween. The film web runs along a ground electrode 22G in vertical alignment with discharge electrode 22. A high-frequency voltage having an amplitude sufficient to produce a corona discharge is applied to electrode 22. The resultant corona discharge which is directed toward the upper surface of the film web, acts to increase the surface energy at the web surface to render it wettable and therefore receptive to adhesives, but it does not affect the molecular orientation of the film.

Also placed along the stretch following the first discharge station 22-22G is a second corona discharge station for subjecting the undersurface of film web 18 to a corona discharge to render this surface wettable so that it is receptive to an adhesive to be later applied thereto when the sheeting is put to use. The second station consists of a corona discharge electrode 23 which is spaced from the undersurface of web 18 to create an air gap therebetween, and a cooperating ground electrode 23G engaging the upper surface of the web.

Intermediate the second corona discharge station 23-23G and the combining station is an adhesive applicator 24 having a coating roll 25 which engage the now wettable upper surface of film web 18 and applies thereto a water-based, acrylic polymer adhesive for laminating the film web to the paper web to form the laminating adhesive layer 11 of the sheeting.

Thus concurrently entering the nip of pressure rolls 14 and 15 of the combining station at ambient temperature are the paper web 17 and the adhesive-coated film web 18. These webs are subjected to pressure by pressure rolls 14 and 15, cold-lamination being effected by this action.

The laminated webs from the combining station are wound on an output reel 26 driven by a motor 27 whose operation is synchronized with motor 16 driving the pressure rolls, for these motors together serve to draw the webs from their supply reels. Output reel 26 is spaced from combining station 14, 15 so as to provide a long stretch sufficient to permit drying out and setting of the adhesive applied to the webs.

In order to ensure that the water-based adhesive is in a wet state when the paper and film webs enter combining rolls 14 and 15 in which the webs are cold laminated, the wet adhesive is coated on the film web 18 before this web meets the paper web 17 at idler roll 20 just in advance of the combining rolls. Because the paper web quickly absorbs the wet adhesive, it is important that the period in which the wet adhesive makes contact with the paper web be short.

Because the system shown in FIG. 3 makes use of a solvent-free, water-based adhesive to effect cold lamination of the paper ply and to the film ply, the system may be operated at high speed, for little time is required to dry and set the adhesive. And because of cold lamination, the orientation of the plastic film is not adversely affected thereby. Nor does cold lamination prematurely activate the heat-sensitive paper ply.

While there have been shown preferred embodiments of the invention, in practice, many changes may be made in the paper-plastic laminate sheeting without departing from the spirit of the invention.

We claim:

1. A system for producing a heat activatable laminate sheeting capable of exhibiting heat activated indicia, the system comprising:
   a first web of heat activatable sheet material that changes color when activated by a selected application of heat,
   a second web of a plastic film,
   an applicator supplying a water-based adhesive to a surface of one of the first and second webs, and
   a combining station operative at ambient temperature to effect cold lamination of the first and second webs without activating the heat activatable sheet material and without adversely affecting the plastic film.

2. The system of claim 1 wherein the water-based adhesive supplied by the applicator is a polyvinyl acetate modified copolymer.

3. The system of claim 1 wherein the water-based adhesive supplied by the applicator is a polyacrylic copolymer.

4. The system of claim 1 wherein the applicator is disposed to coat a first surface of the second web which is opposed to the first web.

5. The system of claim 4 further including a first corona discharge station disposed upstream of the applicator for corona-discharge treating the first surface.

6. The system of claim 5 further comprising a second corona discharge station for corona-discharge treating a second surface of the second web.

7. The system of claim 1 wherein the heat activatable sheet material is paper.

8. The system of claim 1 wherein said plastic film is an oriented plastic film.

9. A system for producing a heat activatable laminate sheeting capable of exhibiting heat activated indicia, the system comprising:

a first web of heat activatable sheet material that changes color when activated by a selected application of heat, a second web of oriented synthetic plastic film, an applicator supplying a water-based adhesive to a first surface of one of the first and second webs, a first corona discharge station disposed upstream of the applicator for corona-discharge treating the first surface, and a combining station operative at a temperature to effect cold lamination of the first and second webs without activating the heat activatable sheet material and without adversely affecting the oriented synthetic plastic film.

10. The system of claim 9 further comprising a second corona discharge station for corona-discharge treating a second web surface opposite to the first web surface.

11. The system of claim 9 wherein the heat activatable sheet material is paper.

* * * * *

UNITED STATES PATENT AND TRADEMARK OFFICE
CERTIFICATE OF CORRECTION

PATENT NO. : 5,670,015

DATED : September 23, 1997

INVENTORS : Arnold B. Finestone, et al.

It is certified that error appears in the above-identified patent and that said Letters Patent is hereby corrected as shown below:

TITLE PAGE [76] Inventors: Line 3, change "3149 S. Malo Ct.," to --3349 S. Malo Ct.,--.

Signed and Sealed this

Twenty-first Day of July, 1998

*Attest:*

BRUCE LEHMAN

*Attesting Officer*    *Commissioner of Patents and Trademarks*